United States Patent [19]

Zana

[11] Patent Number: 5,363,185
[45] Date of Patent: Nov. 8, 1994

[54] METHOD AND APPARATUS FOR IDENTIFYING THREE-DIMENSIONAL COORDINATES AND ORIENTATION TO A ROBOT

[75] Inventor: Lawrence J. Zana, Hampton Township, Allegheny County, Pa.

[73] Assignee: The United States of America as represented by the Secretary of the Air Force, Washington, D.C.

[21] Appl. No.: 995,430

[22] Filed: Dec. 23, 1992

[51] Int. Cl.$^5$ .............................................. G01B 11/24
[52] U.S. Cl. ......................................... 356/2; 356/375
[58] Field of Search ............... 330/2, 375, 376; 356/2, 356/375, 376

[56] References Cited

U.S. PATENT DOCUMENTS

| | | | |
|---|---|---|---|
| 4,396,945 | 8/1983 | DiMatteo et al. | 356/375 |
| 4,529,316 | 7/1985 | DiMatteo | 356/376 |
| 4,590,578 | 5/1986 | Barto, Jr. et al. | 364/513 |
| 4,644,633 | 2/1987 | Jones et al. | 29/566.3 |
| 4,714,339 | 12/1987 | Lau et al. | 356/4.5 |
| 4,744,664 | 5/1988 | Offt et al. | 356/376 |
| 4,813,436 | 3/1989 | Au | 356/375 |
| 4,814,884 | 3/1989 | Johnson et al. | 358/183 |
| 4,914,734 | 4/1990 | Love et al. | 342/64 |
| 4,923,303 | 5/1990 | Lutz | 356/375 |
| 4,957,369 | 9/1990 | Antonsson | 356/376 |

Primary Examiner—Richard A. Rosenberger
Attorney, Agent, or Firm—William G. Auton; Donald J. Singer

[57] ABSTRACT

A system and a process for identifying three-dimensional coordinates and orientation to a robot. A pair of CCD video cameras are used to measure the position of a laser or other light source spot on the surface of a workpiece. The laser and cameras need not be fixed to each other, and the laser may be handheld. In operation, the light source provides a small spot of light centered on the location to be indicated to the robot. The spot of light is then located in the field of view of each of the cameras. Using the concept of stereo triangulation, the three-dimensional coordinates of the spot are calculated by a microcomputer. These coordinates are then transformed into a form which is recognizable by the robot. The spot of light from the object can also be generated by an emitter (such as an LED or Laser diode) which is fixed on the workpiece and stimulated by an energy source.

10 Claims, 6 Drawing Sheets

METHOD AND APPARATUS FOR IDENTIFYING THREE-DIMENSIONAL COORDINATES AND ORIENTATION TO A ROBOT

The invention described herein may be manufactured and used by or for the Government for governmental purposes without the payment of any royalty hereon.

BACKGROUND OF THE INVENTION

The present invention relates generally to automated assembly systems more specifically the invention pertains to a system and a process which can be used to identify three dimensional coordinates and orientation to a robot.

The use of robots in manufacturing has been rapidly growing for over a decade. Commonly, robots are used for purposes of improving quality and increasing productivity. However, robots are being applied to situations where the robot design and the associated control systems are insufficiently advanced for satisfactory performance. Many robots in present use were first designed for simple operations such as pick and place or spot-welding where accuracy and kinematic performance were not crucial. However, newer robot applications, such as assembly, deburring, seam-welding, inspection, machining, drilling and the like require better performance and accuracy than that originally required of earlier robot systems.

Present methods of identifying three-dimension (3D) coordinates to a robot generally involve physically moving the robot and any attached end effector into the desired position, and then commanding the robot to "remember" the position for later reference. In many robotic systems, this procedure is impractical and undesirable for several reasons. First, it creates a safety hazard for the operator, as does any movement of the robot arm with an operator in close proximity. There is also a "hazard" for the workpiece and the robot itself. Second, in many production robotic systems, the throughput of the system would be greatly improved if the "teach" operations could be done "off-line"—that is, out of the work area of the robot. This is not possible if the robot arm itself is the teaching device. Third, manual movement and jogging of the robot arm is a time consuming and tedious process, and severely affects the throughput of the system. In addition to three-dimensional coordinates, it is commonly necessary to also specify orientation to the robot. A secondary "orientation" mode of operation allows for this.

Clearly a better method of identifying 3D locations to the robot system is required. This method should have the capability of being used in an off-line mode, and must not present a safety hazard to the operator, the robot, or the workpiece. It must also be easy and efficient to use from an operator standpoint.

One of the most difficult problems is that of determining the positional accuracy of an industrial robot throughout its large work zone. Just the fact that a robot has been instructed to assume some position does not guarantee that it has in fact done so. Several positional problems exist, and for this reason three-dimensional surface geometry acquisition is an important area of research for a wide variety of micro and macroscopic three-dimensional surface geometries. Several classes of problems are involved, such as long distance landscape measurement via radar and earth surface elevation via satellite laser altimeters. However the problem of accurately determining the surface geometry of a numerically machined part for example is not well-solved.

The task of providing a method identifying three-dimensional coordinates and orientation to a robot is alleviated to some extent, by the systems disclosed in the following U.S. Patents, the disclosures of which are incorporated herein by reference.

U.S. Pat. No. 4,957,369 issued to Antonsson;
U.S. Pat. No. 4,714,339 Issued to Lau et al;
U.S. Pat. No. 4,590,578 issued to Barto, Jr. et al;
U.S. Pat. No. 4,529,316 Issued to Di Matteo;
U.S. Pat. No. 4,644,633 issued to Jones et al;
U.S. Pat. No. 4,814,884 issued to Johnson et al; and
U.S. Pat. No. 4,914,734 issued to Love et al.

The patents identified above relate to methods and apparatus for measuring or tracking surface coordinates. In particular, the Antonsson patent describes an apparatus and technique for measuring three-dimensional surface geometries. The apparatus comprises lateral photo-effect diodes and a light source capable of providing a tightly-focused, pulsed light spot. The light spot is focused on and scanned across the surface to be measured. The diode detectors are mounted in the focal plane of a pair of cameras, and return azimuth and elevation information for each spot. With knowledge of the location and orientation of the cameras, as well as calibration corrections of each camera, a computer can utilize the azimuth and elevation information to reconstruct the full three-dimensional location of each reflected light spot. The Lau et al patent is directed to a tracking system for measuring the spatial coordinates of a target. The system provides for a collimated beam to be directed to the target. A mirror attached to the target reflects the beam back to a tracking point, where photo-sensors provide error signals to a servo system which controls optics at the tracking point. The error signals are indicative of the direction necessary to accomplish the coincidence of the beams. An interferometer interferes the source beam with the beam that has travelled twice between the tracking and target points in order to measure separation. By measuring the directions of the beams relative to structure attached to the tracking and target points, the target point can be located in spatial coordinates.

The Barto, Jr. et al patent relates to a system for the off-line programming of a robot. The system provides for a workpiece to be mounted to a fixture and located within a robot's work envelope. Based on stored data, the robot touches-off on the fixture to determine the gross orientation and displacement of the workpiece. Based on that data, a coordinates transformation is determined which is applied to stored coordinates which define the locations on the workpiece for local features. The position of the local features on the workpiece is then measured to compensate for robot inaccuracies. Based on the data thus gathered, a second coordinate transformation is determined for correction of stored machine operation location coordinates.

The Di Matteo patent describes a method for eliminating erroneous data in three-dimensional optical sensors. According to the method, the surface location of points is measured with two different sensors, and false data reports are detected and eliminated by cross-correlating the data obtained from two different optical detector locations. To obtain the data reports, a point on a surface being investigated is illuminated, and the light directed onto a detector. The location of the point is computed by triangulation methods. The light applied to the surface at the point being investigated is also reflected in a different direction onto another detector, which uses the detected reflected light to compute the position of that point on the surface. The two computations are compared, and if the results are identical, then the point is designated as a true point on the surface.

The Jones et al patent describes the Westinghouse robotic lead forming system that can make use of the present invention.

The Johnson et al patent includes a three-dimensional pixel window generator which maps frames of serially scanned data.

The Love et al patent uses intensity area correlation to map terrain by passive infrared emissions.

While the above-cited references are instructive, the need for mapping three-dimensional coordinates for robotic assembly systems represents an ongoing technical interest. The present invention is intended to help satisfy that need.

SUMMARY OF THE INVENTION

The present invention includes both a system and a process for identifying three-dimensional coordinates and orientation of a workpiece for an automated robot using a stereo optical correlation system containing two cameras and a computer. The process contains three steps, and begins by selectively illuminating the three-dimensional reference points with a hand held light source. In one embodiment of the invention, the light source is a laser pen, which reflects a beam of light off of a fixed workpiece with spots of light that identify the three-dimensional reference points on the workpiece. In another embodiment of the invention the laser pen is used to stimulate the emission of light by a laser diode on the workpiece to indicate the three-dimensional reference points.

The second step of the process entails detecting the illuminated three-dimensional reference points with the two cameras. As described in the Antonsson patent, stereo optical data signals can be generated by two remotely located CCD cameras that can be used to calculate three-dimensional distances using conventional geometry.

In the third step, the computer is used to calculate the three-dimensional coordinates of the reference points from the stereo optical data signals generated by the two cameras.

The present invention can also be defined as a stereo optical correlation system that uses a computer, two remote CCD cameras and a hand held light source to identify three-dimensional coordinates and orientation for an automated robot as described above. The use of a hand held light source can allow users to quickly identify either the origin of a three-dimensional grid (with one spot of light) or can be used to provide three reference points to define the plane of a workpiece with three spots of light.

It is an object of the invention to provide flexibility in identifying the orientation of a workpiece in three dimensions for an automated robot without requiring movement of either the robot or the workpiece.

It is another object of the invention to improve existing stereo optical correlation systems by introducing the use of hand-held light sources as a means of quickly identifying three-dimensional reference points.

These objects together with other objects, features and advantages of the invention will become more readily apparent from the following detailed description when taken in conjunction with the accompanying drawings wherein like elements are given like reference numerals throughout.

DETAILED DESCRIPTION OF THE PREFERRED EMBODIMENTS

The present invention includes both a system and a method as mentioned above, the process contains three steps, and begins by selectively illuminating the three-dimensional reference points with a free-moving (or in one embodiment hand-held) light source. In one embodiment of the invention, the light source is a laser pen, which reflects a beam of light off of a fixed workpiece with spots of light that identify the three-dimensional reference points on the workpiece. In another embodiment of the invention the laser pen is used to stimulate the emission of light by a laser diode on the workpiece to indicate the three-dimensional reference points.

The second step of the process entails detecting the illuminated three-dimensional reference points with the two cameras. As described in the Antonsson patent, stereo optical data signals can be generated by two remotely located CCD cameras that can be used to calculate three-dimensional distances using conventional geometry.

In the third step, the computer is used to calculate the three-dimensional coordinates of the reference points from the stereo optical data signals generated by the two cameras.

The present invention can also be defined as a stereo optical correlation system that uses a computer, two remote CCD cameras and a hand held light source to identify three-dimensional coordinates and orientation for an automated robot as described above. The use of a free-moving hand held light source can allow users to quickly identify either the origin of a three-dimensional grid (with one spot of light) or can be used to provide three reference points to define the plane of a workpiece with three spots of light for identifying three-dimensional coordinates and orientation to a robot.

As will be discussed below, one embodiment of the invention uses a pair of CCD video cameras are used to measure the position of a laser, or other light source, spot on the surface of a workpiece. The laser and cameras need not be fixed to each other, and the laser may be handheld. In operation, the light source provides a small spot of light centered on the location to be indicated to the robot. The spot of light is then located in the field of view of each of the cameras. Using the process of stereo triangulation, the three-dimensional coordinates of the spot are calculated by a microcomputer. These coordinates are then transformed into a form which is recognizable by the robot.

Figure 1:
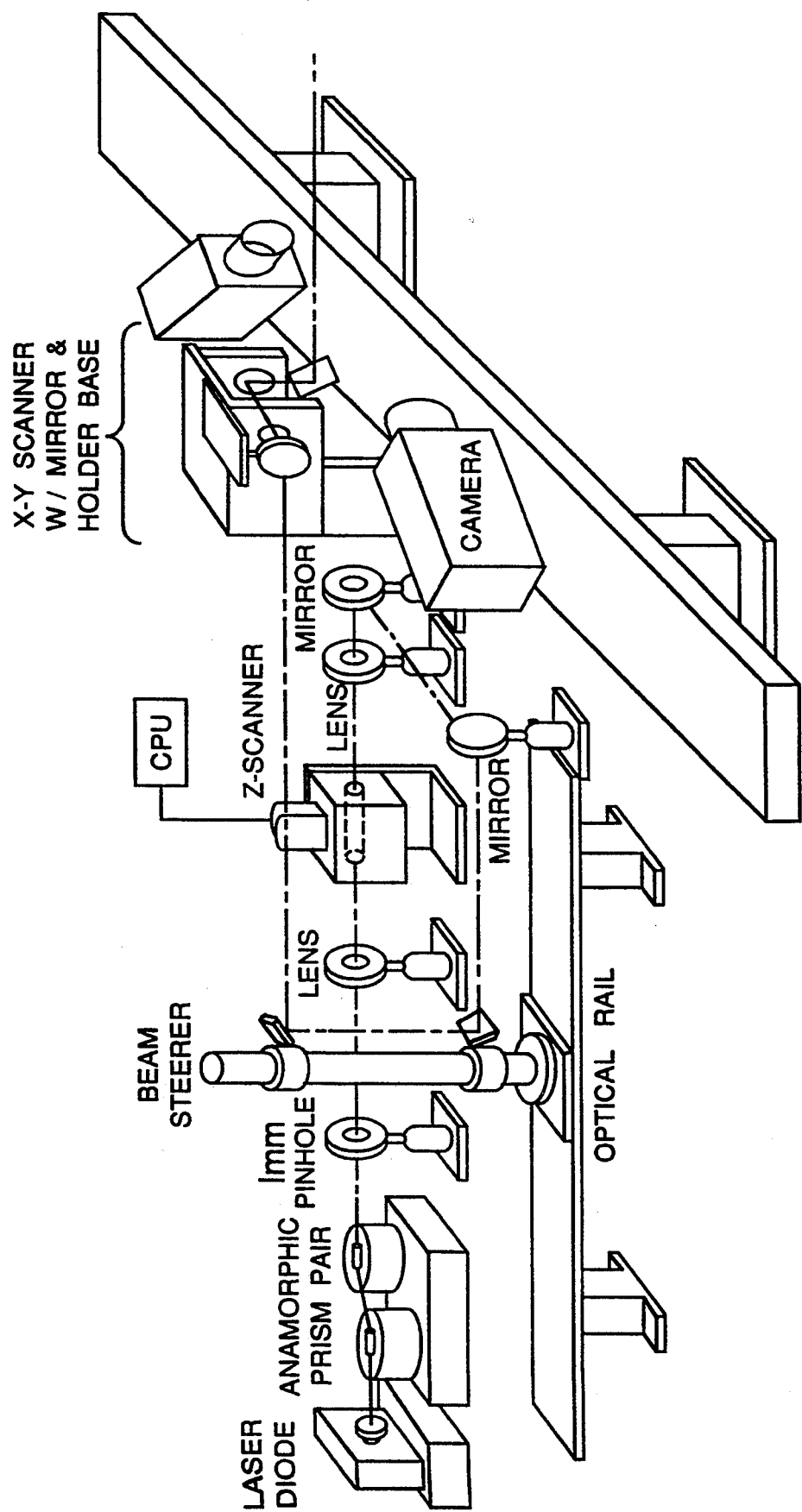
FIG. 1 is an illustration of the prior art Antonsson patent, showing a stereo optical correlation system that can be used with the present invention.

The reader's attention is now directed towards FIG. 1, which is an illustration of the prior art system of the above-cited Antonsson reference. The system of FIG. 1 solves the stereo correlation problem in real-time by utilizing a detector sensitive only to the position of a light spot and illuminating one spot in the scene at a time. This selective illumination is achieved under normal lighting by using an infrared laser diode and common mode rejection of background illumination. FIG. 1 illustrates generally the major components shown in the process of measuring the three-dimensional shape of an object. As seen in FIG. 1, the system comprises a laser diode light source, optical elements including a Z axis scanner and a X and Y axis scanner, a pair of large-linear-area photo-effect-diode cameras and a computer referred to in FIG. 1 as a CPU.

The laser diode being used is a Diolite 800-40 40 mW Diode Laser System that produces an infrared beam with a wavelength of 830 nm to 850 nm. The output beam of the Diolite 800-40 laser diode is elliptically shaped. Accordingly, as seen in FIG. 1, a pair of anamorphic prisms are used to convert the beam to a circular shape. In addition, the diameter of the beam is controlled by using a 1 millimeter hole aperture device in front of the anamorphic prism pair. The beam is then directed to the Z scanner optics which comprises a pair of fixed lenses on each side of a middle lens. The middle lens is adapted to move in the Z direction up to 20 millimeters by mean of a LT1320 13mm Pupil Z Scanning Head and a DX-1000 Digital Driver manufactured by General Scanning Inc. of Watertown, Mass.

The purpose of the Z axis optics is to provide a focused spot size of approximately 10 microns alterable by as much as 50 percent as the surface depth of the object changes up to 200 millimeters. This is accomplished in the Z axis optics by using lenses to compensate for the change that takes place in spot size when the point on the object upon which the focused light spot falls, changes by as much as 200 millimeters. This objective is achieved in the Z axis scanning optics of the Antonsson invention by using an input lens having a focal length of 25 millimeters, an output lens having a focal length of 120 millimeters and a movable lens having a focal length of 10 millimeters. In addition, the spacing between the input lens and the nominal position of the movable lens is set at 250 millimeters and the distance between the output lens and the nominal position of the movable lens is set at 160 millimeters. With this embodiment of the scanner optics, it has been found possible to alter the focal point in the Z direction by approximately 250 millimeters with a 10 millimeter shift in the position of the movable lens while limiting the change in spot size to less than 50 percent.

As seen further in FIG. 1, the light-beam passing through the Z scanner is applied to an XY scanner which alters the position of the focused spot of laser light on the object in the vertical and horizontal directions. As seen best in FIG. 1, the light-beam passing through the Z scanner at the second lens F2 of FIG. 1, is applied to a pair of diagonally oriented mirrors to horizontally turn the laser beam 180 degrees and is then applied to a beam steerer which repositions the laser beam to a different horizontal plane to accommodate the height of the XY scanner. The beam steerer is provided with a pair of diagonally disposed mirrors to again reverse the beam through 180 degrees this time in a vertical plane. The XY scanner comprises three mirrors, one of which is used to direct the laser beam into the internal structure of the scanner and two of which are responsible for the movement of the beam in a two dimension X-Y position array depending upon the angular orientation of the remaining two mirrors. One such XY scanner employed is a Model XY2030 20 mm Pupil XY Scanner Head and a DXZ103 digital driver also manufactured by General Scanning, Inc.

As seen in FIG. 1, there is a stationary camera positioned on each side of the XY scanner and oriented to point in the general direction of the object being measured. Each of the cameras comprises a lens and detector plate. Each such detector plate comprises a commercially available large-linear-area lateral-photo-effect diode system. The operation of the present invention is dependent upon the diode detectors which produce analog currents at their edges which are proportional to the location of the centroid of the light spot on the surface. These detectors are each a single monolithic sensor and not an array of discrete sensors.

In FIG. 1, the CPU uses the mathematical relationships of conventional geometry to solve the stereo correlation problem, and identify three-dimensional coordinates which may be used by an automated robot. Unfortunately, present methods of identifying 3-D coordinates to a robot generally involve physically moving the robot into the desired position. This is a tedious and time consuming task, and involves some risk for the operator, the robot, and the workpiece involved. The present invention provides a non-contact, handheld method of identifying these points to the robot system, and can use the elements of FIG. 1 as described below.

Figure 2:
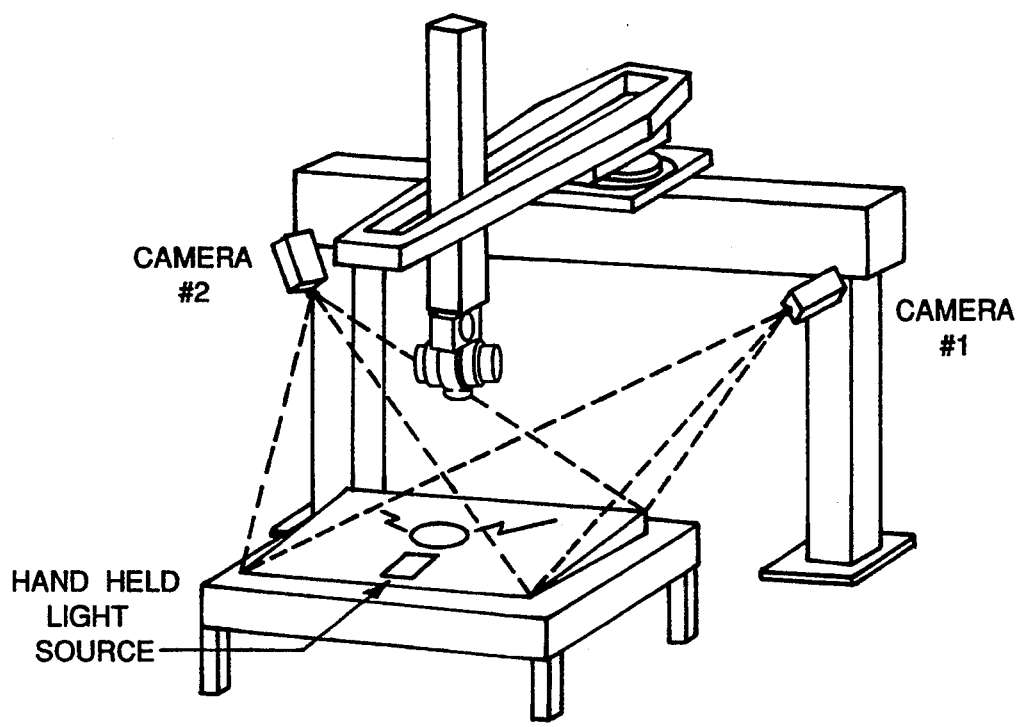
FIG. 2 is an illustration of some of the key elements of the stereo optical correlation system.
Figure 3:
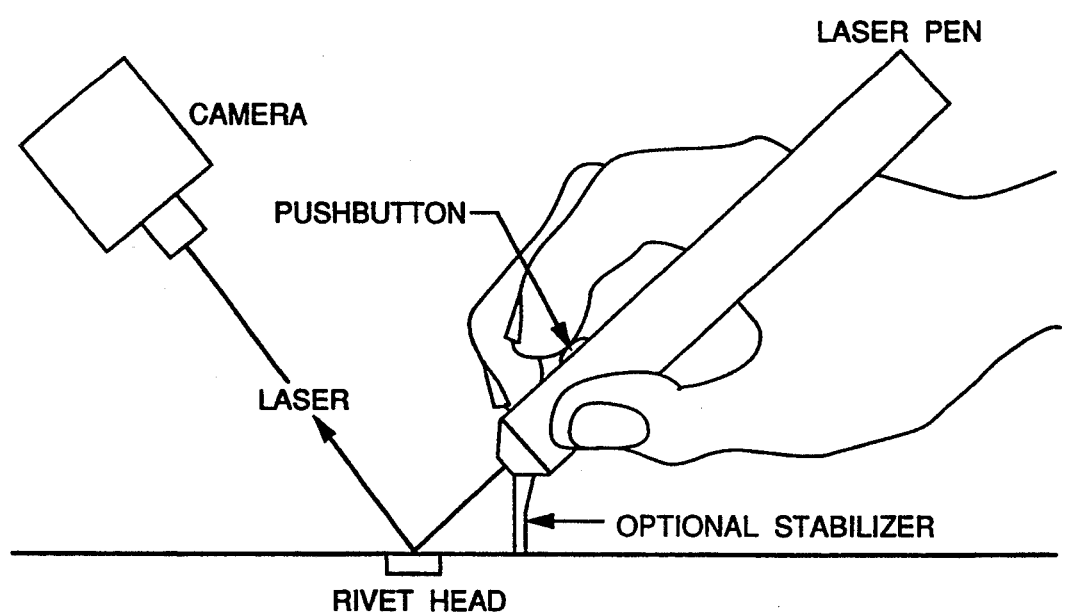
FIGS. 3 and 4 depict two embodiments of the invention that use a hand held laser pen to illuminate three-dimensional reference points on a workpiece.

FIG. 2 is an illustration of the stereo triangulation equipment used in the present invention. Like the Antonsson system, the present invention uses a stereo pair of CCD video cameras to measure the position of a laser spot (or other light source) on the surface of a workpiece. This invention does not require the laser and camera to be fixed to each other, thereby allowing the laser to be hand-held and free to be moved. This concept of a free-moving or in some cases a hand-held, non-contact robotic teaching device is thought to be unique to the industry, and is shown in FIG. 3.

To use the device, an operator places the light source in such a manner that a small spot of light is centered on the location he wishes to indicate to the robot, and then pushes a small button located on the hand-held device. The invention then locates the spot of light in the field of view of each of the cameras, and calculates the three-dimensional coordinates of the spot using the concept of stereo triangulation. The system will give the operator an audio and/or visual indication of acceptance of the point. The invention will then perform further calculations to transform the three-dimensional coordinates to a form recognizable by the robot, and the CPU of FIG. 8. As mentioned above, three-dimensional coordinates can be located either using a single spot of light (to direct the origin of a three-dimensional grid) or by using three spots of light as reference points.

Figure 9:
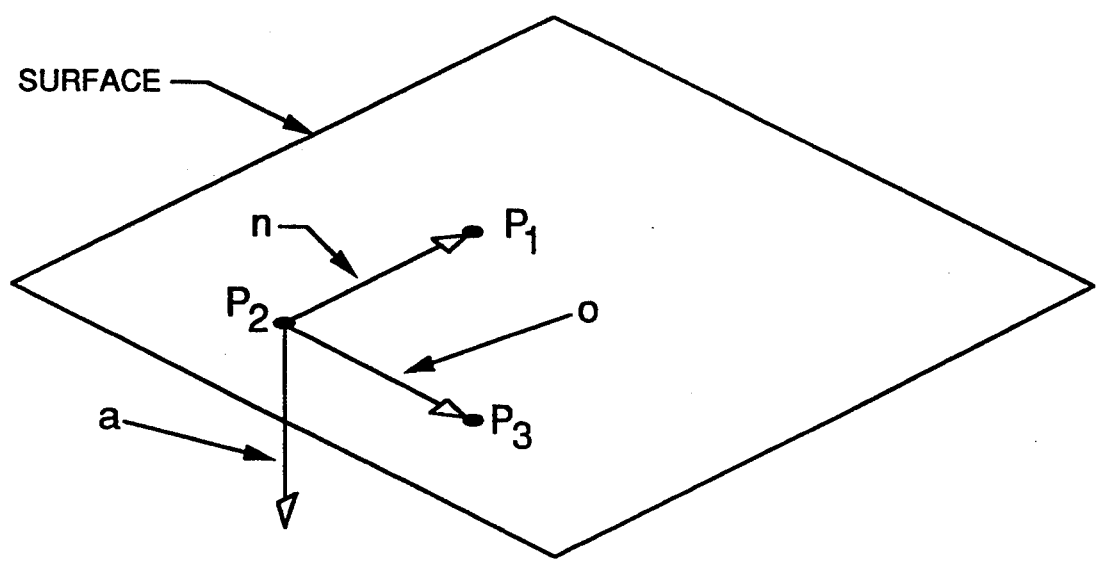
FIG. 9 illustrates how three cartesion points can define surface orientation vectors.

In the orientation specification mode (see FIG. 9), the operator indicates three points to the system, each point being located on a plane such that a vector normal to the plane is parallel to the desired orientation vector. The system then uses the three points to derive the desired orientation vector.

FIG. 2 shows one possible arrangement that can be used with a Unimation 6000 robot to implement this technique. To provide off-line teaching capability, a robot with a 20 foot X-axis would be used, so that teaching could be done in one half of the workcell while the robot was working on another workpiece in the other half of the workcell. Alternatively, a robot with a robot waist could be used so that teaching could be done on one side of the X-axis while the robot works on the opposite side.

Figure 4:
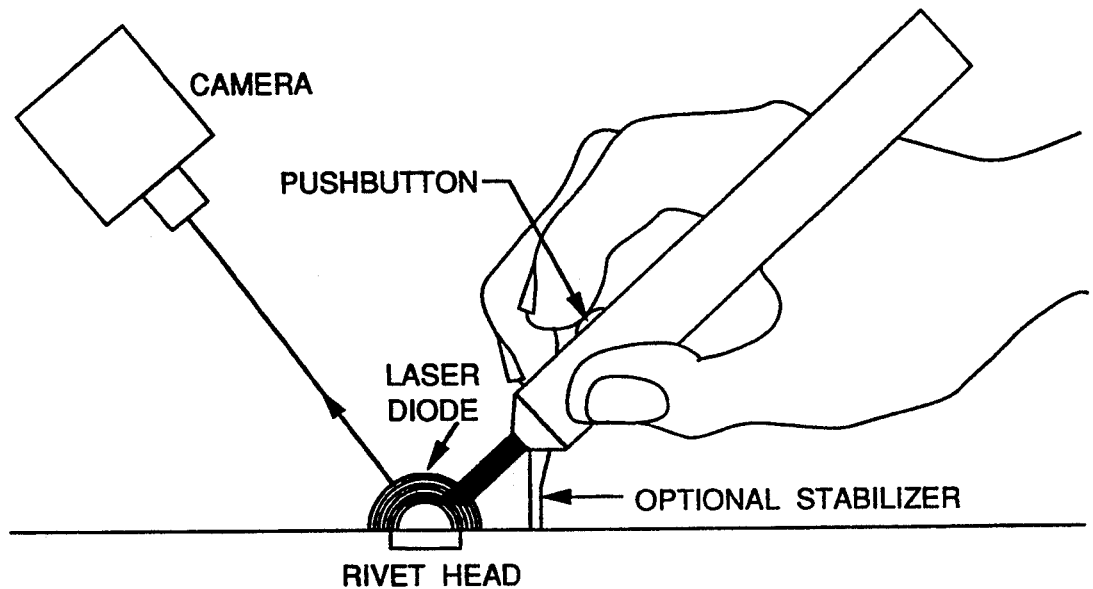
Figure 5:
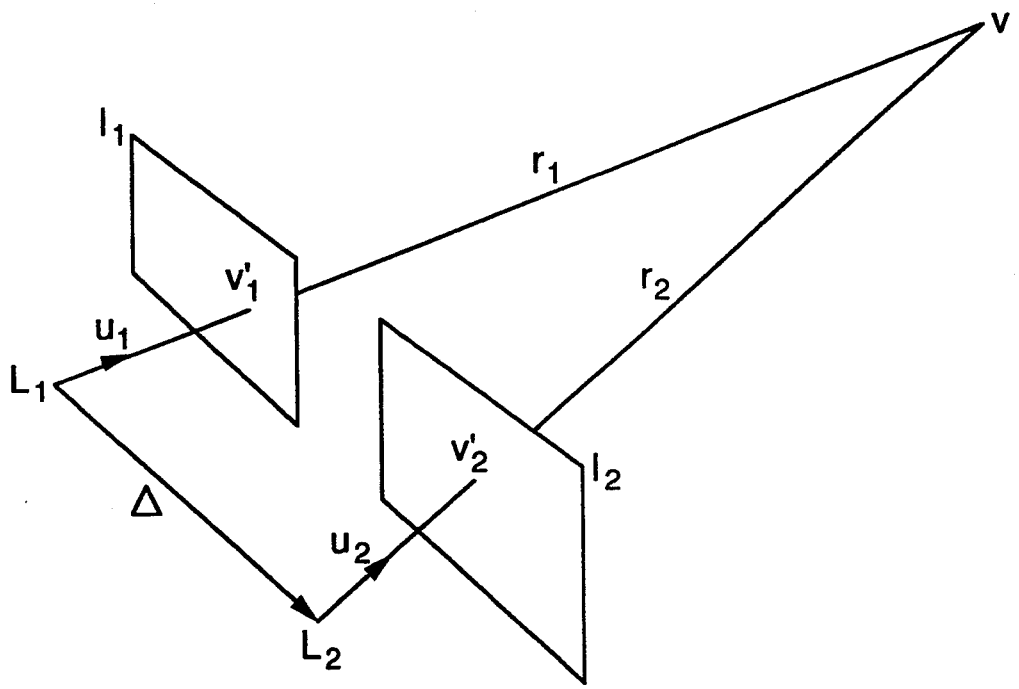
FIGS. 5 and 6 are illustrations of three-dimensional geometry variables for stereo optical correlation.

Ideally, the light source will be a point source of light placed as physically close to the desired position as possible, as seen from the video cameras. FIGS. 3 and 4 show two possible concepts for handheld light sources. In FIG. 3, the reflection of a laser pen off a rivet head into the camera is used to pinpoint a specific three-dimensional reference point to a CPU. In FIG. 4, a laser diode, or high-intensity LED, aimed upward toward the cameras, is stimulated by a hand-held energy source, and is used instead of the laser, thereby avoiding the need to reflect the light off of the surface being taught. (Note that the use of energy sources to stimulate the emission of light by an LED is known in the art, and described in such texts as "Semiconductor Lasers and Helerojunction LEDs" by H. Kresse et al, the disclosure of which is incorporated herein by reference. FIG. 5 illustrates the stereo geometry that can be used by the CPU of FIG. 1, as discussed below.

There are two cameras, giving us two image planes $I_1$ and $I_2$, two lens centers $L_1$ and $L_2$, and two projecting rays $r_1$ and $r_2$ between respective lens centers and the object point v. The vectors $u_1$ and $u_2$ are taken to be unit vectors in the direction of the projecting rays. The vector $\Delta = L_2 - L_1$ is called the baseline vector; its magnitude is called simply the baseline.

As can be seen from the diagram, the object point will generate two image points (because two cameras are used) $v'_1$ and $v'_2$ in the respective image planes. It is the difference, or disparity, between these points that allows us to calculate the three-dimensional coordinates of the object point. The 3D locations of the two image points, together with the 3D locations of the lens centers, define the unit vectors $u_1$ and $u_2$.

Figure 8:
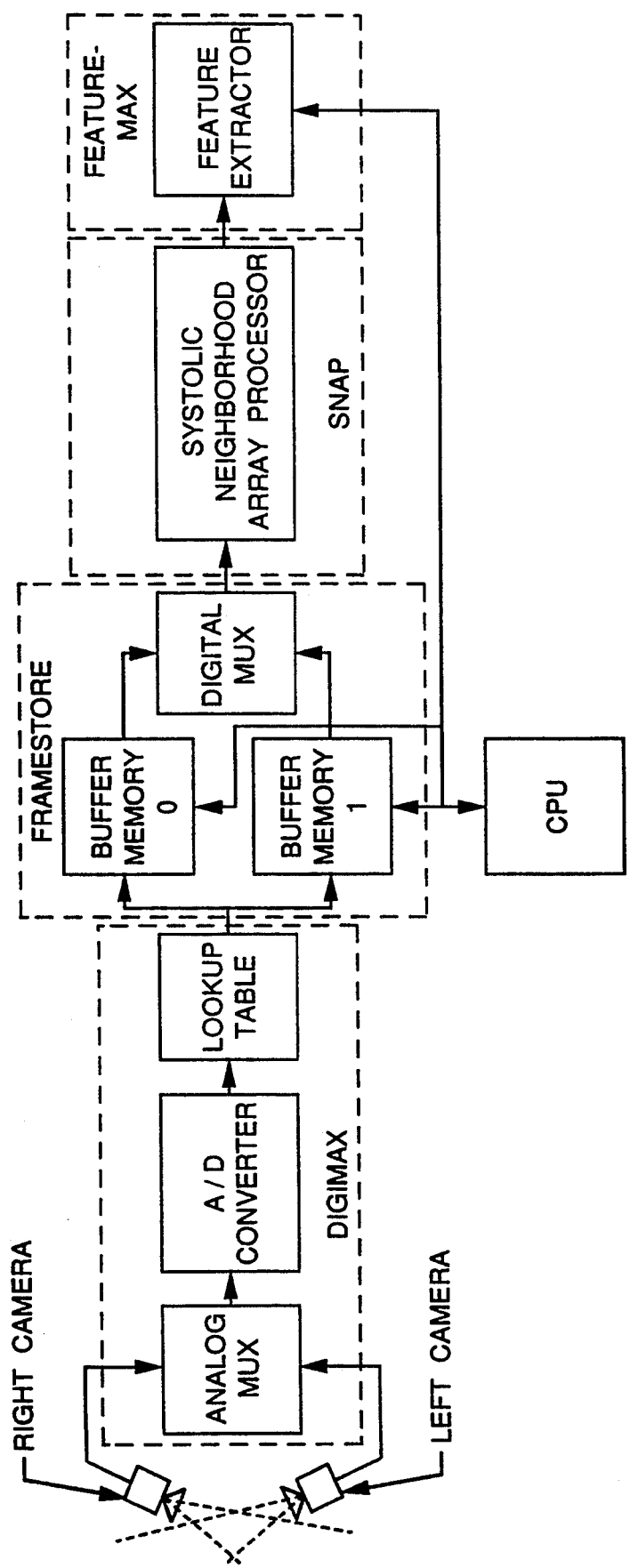
FIG. 8 illustrates the signal processing blocks in the preferred embodiment of the invention.

The first step in the process is locating the spot of light in the left and right image planes ($v'_1$ and $v'_2$). FIG. 8 shows camera, optics, microcomputer, and image processing hardware configuration that accomplishes this. The cameras are equipped with narrow bandpass optical filters over the lenses, whose nominal wavelength is centered on the wavelength of the light source. The purpose of this filter is to minimize the effects of ambient light reflections on the surface of the part. In the example shown here, this wavelength is that of a Helium Neon (HeNe) laser (632.8 nm).

The cameras are CCD array video cameras, with RS-170 video output signals. These signals are multiplexed by an analog switch on the DIGIMAX board. The left camera image is digitized first and stored in one of the FRAMESTORE buffers. The right camera is then digitized and stored in another buffer. The SNAP and FEATUREMAX boards then locate the light spot in the left and right images, and make the location information available to the microcomputer.

The i, j coordinates of the spots in the left and right images are all that is needed for the microcomputer to calculate the coordinates of the light source in free space. Extracting these coordinates using subpixel measurement techniques can improve the accuracy of the system.

The 3D location $v_p$, of a point on the image plane, $v'$, is given by the inverse perspective transformation $$v_p = \begin{bmatrix} x_o \\ y_o \\ z_o \end{bmatrix} +$$

$$\begin{bmatrix} (x'_p + l_1\cos\theta) & - & (f + l_2)\cos\phi\sin\theta & + & (z'_p + l_3)\sin\phi\sin\theta \\ (x'_p + l_1\sin\theta) & + & (f + l_2)\cos\phi\cos\theta & - & (z'_p + l_3)\sin\phi\cos\theta \\ & & (f + l_2)\sin\phi & + & (z'_p + l_3)\cos\phi \end{bmatrix}$$

and the location of an arbitrary lens center, L is given by $$L = \begin{bmatrix} x_o \\ y_o \\ z_o \end{bmatrix} + \begin{bmatrix} l_1\cos\theta & - & l_2\cos\phi\sin\theta & + & l_3\sin\phi\sin\theta \\ l_1\sin\theta & + & l_2\cos\phi\cos\theta & - & l_3\sin\phi\cos\theta \\ & & l_2\sin\phi & + & l_3\cos\phi \end{bmatrix}$$

Figure 6:
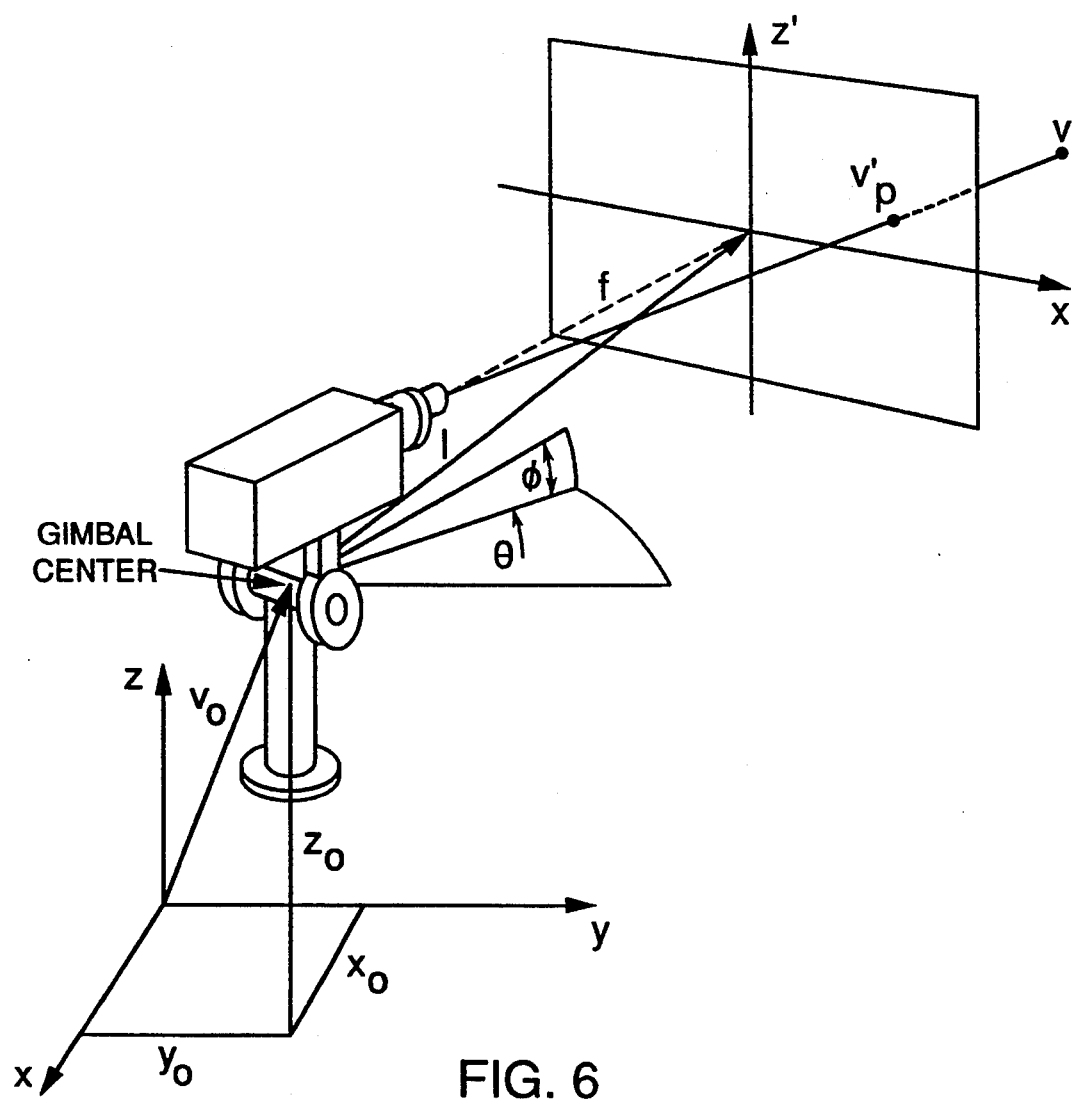

Referring to FIG. 6 we need to know for each camera the coordinates of its gimbal center, $x_o, y_o$, and $z_o$, the gimbal to image plane offset, vector 1, the camera lens f-number, the pan angle $\theta$, and the tilt angle $\phi$. These numbers can be determined from direct measurements or by means of a calibration procedure. The latter method is considered to result in a more accurate determination of the numbers.

A vector in the direction of the projecting ray is defined by $v_p - L$, and a unit vector in the same direction is calculated by $$u_i = \frac{v_{pi} - L_i}{||v_{pi} - L_i||}$$

where i=1,2 for the left and right camera respectively.

Ideally, there will exist two numbers a and b, such that $au_1 = \Delta + bu_2$. After finding such numbers, one would simply set $v = L_1 + au_1$.

In practice however, we can take it for granted that the two projecting rays will fail to intersect exactly because of various errors (e.g., camera misalignment). A reasonable recourse in this case is to place v midway between the two projecting rays at their closest approach. Formally, we set $$v = \frac{a_o u_1 + (\Delta + b_o u_2)}{2} + L_1$$

where $a_o$ and $b_o$ are the values of a and b that minimize $$J(a,b) = ||au_1 - (\Delta + bu_2)||^2.$$

Using vector calculus methods, J(a,b) is minimized by setting $$a_o = \frac{u_1 \cdot \Delta - (u_1 \cdot u_2)(u_2 \cdot \Delta)}{1 - (u_1 \cdot u_2)^2}$$

-continued
$$b_o = \frac{(u_1 \cdot u_2)(u_1 \cdot \Delta) - u_2 \cdot \Delta}{1 - (u_1 \cdot u_2)^2}$$

Orientation of the end effector is important in many robotic applications. The "orientation mode" of operation of the invention allows a user to specify a desired orientation vector for the end effector, or tool. For many applications and workpieces, this desired orientation vector will be normal to some planar surface of the workpiece.

To specify a tool orientation, the user indicates three arbitrary points on this surface. If the rotation around tool-z of the robot (T angle) i important to the application (i.e. a 6-axis system), the first two points are used to get the tool orientation vector, o. Otherwise, the order in which the points are specified is unimportant.

Figure 7:
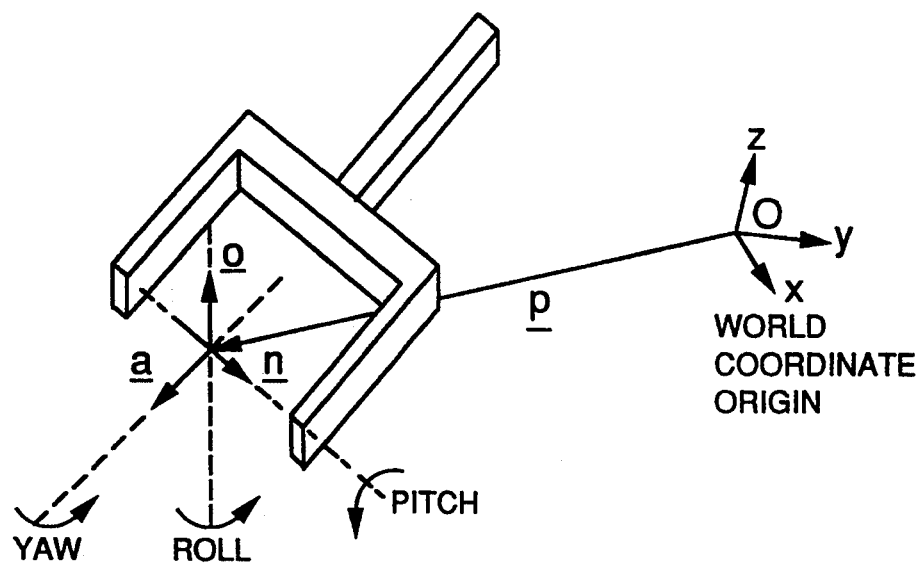
FIG. 7 is an illustration of a robot end effector and the three unit vectors of orientation.

FIG. 7 shows a typical robotic end effector and the three unit vectors that describe its orientation. The z vector lies in the direction from which the hand would approach an object and is known as the approach vector, a. The y vector, known as the orientation vector o, is in the direction specifying the defined orientation of the tool. The final vector, known as the normal vector, n, forms a right-handed set of vectors and is thus specified by the vector cross-product. Therefore, specifying any two of the vectors uniquely determines the third.

The three points specified by the user will form the two required vectors. As indicated by $P_1$, $P_2$, and $P_3$ in FIG. 9, in the default mode of operation, they will be used to form the o and n vectors. The a vector will then be formed by the vector cross product $a = n \times o$. It is possible to enable secondary modes in which the three points will define the o and a or the a and n vector pairs.

The invention can also provide a default orientation for the Antonsson system. This is desirable in some applications, such as in the deriveting of aircraft components, where many points would all share the same desired orientation vector.

The last step in the method involves formatting the desired position and orientation into a form usable by the robot. The desired world x, y, and z coordinates will form a vector p that positions the end of the tool in world coordinate space. A standard homogeneous translation transform can be formed from the p vector in the following manner:

$[1 0 0 p_x]$
$[0 1 0 p_y]$
$[0 0 1 P_z]$
$[0 0 0 1]$

Similarly, the n, o, and a vectors can form a standard homogeneous orientation transform:

$[n_x\ o_x\ a_x\ 0]$
$[n_y\ o_y\ a_y\ 0]$
$[n_z\ o_z\ a_z\ 0]$
$[0\ 0\ 0\ 1]$

These two transforms can be combined to form a single homogeneous translation and orientation transform $[n_x\ o_x\ a_x\ p_x]$
$[n_y\ o_y\ a_y\ p_y]$
$[n_z\ o_z\ a_z\ p_z]$
$[0\ 0\ 0\ 1]$ that uniquely specifies the position and orientation of the robot's end effector.

In some robotic systems, a different but equivalent representation of the position and orientation is used in the form of the Euler angles, X, Y, Z, O, A, and T. These can be calculated in the following manner:

$X = P_x$
$y = p_y$
$Z = P_z$
$O = \tan^{-1}(a_x/a_y)$
$A = \tan^{-1}(-a_z/n_z^2 + o_z^2)$
$T = \tan^{-1}(o_z/-n_z)$ In the case where $\cos(A) \approx 0$, we calculate
$O = \tan^{-1}(o_y/o_x)$
$T = 0$ to avoid a mathematical degeneracy.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. In combination with a stereo optical correlation system which uses a computer, and two cameras to locate an object in three dimensions, a process for identifying three-dimensional coordinates and orientation, said process comprising the steps of:
    selectively illuminating at least one three-dimensional reference point on said object with a free-moving light source, said illuminating step identifying the three-dimensional reference point for orientation in three-dimensions, wherein said object is a fixed workpiece, and wherein said illuminating step is performed with a hand-held laser pen which reflects a beam of light off of said fixed workpiece to indicate the three-dimensional reference point on said workpiece;
    detecting said three-dimensional reference point with said two cameras to provide thereby stereo optical data signals; and
    calculating the three-dimensional coordinates of the three-dimensional reference point from the stereo optical data signals with the computer.

2. A process, as defined in claim 1, wherein said laser pen illuminates three separate three-dimensional reference points on said workpiece.

3. A process, as defined in claim 1, wherein said laser pen illuminates three separate three-dimensional reference points on said workpiece, which said computer uses to calculate an orientation vector.

4. A stereo optical correlation system comprising:
    a hand-held free-moving light source which illuminates at least one three-dimensional reference point on an object;
    a pair of remotely located cameras that detect said three-dimensional reference point and output stereo optical data signals thereby; and
    a computer which calculates three-dimensional coordinates from said stereo optical data signals.

5. A stereo optical correlation system, as defined in claim 4, wherein said hand-held free-moving source comprises a laser pen which reflects a beam of light off of a workpiece to indicate the three-dimensional reference point.

6. A stereo optical correlation system, as defined in claim 5, wherein said laser pen illuminates three separate three-dimensional reference points on said workpiece.

7. A stereo optical correlation system, as defined in claim 4, wherein said free-moving light source comprises an energy source which stimulates an emitter wherein said emitter is on a workpiece, and wherein said emitter is aimed toward said cameras to indicate the three-dimensional reference point on the workpiece.

8. A stereo optical correlation system, as defined in claim 6, wherein said laser pen illuminates three separate emitters to indicate three separate three-dimensional reference points on said workpiece, which said computer uses to calculate an orientation vector.

9. A stereo optical correlation process, for locating a workpiece, said process comprising the steps of:

fixing a set of emitters on said workpiece;

selectively activating emitters of interest on said workpiece using a hand-held light source;

detecting said emitters of interest with a stereo optical correlation system which includes two cameras to locate said emitter, said two cameras providing stereo optical data signals which provide orientation in three dimensions; and calculating three-dimensional coordinates for said workpiece from the stereo optical data signals.

10. A stereo optical correlation process, as defined in claim 9 wherein each of said emitters of interest comprises a light emitting diode which is stimulated to emit when activated by said hand-held light source.

* * * * *